United States Patent [19]
Tokumaru et al.

[11] Patent Number: 4,991,969
[45] Date of Patent: Feb. 12, 1991

[54] METHOD FOR MEASURING FILM THICKNESS

[75] Inventors: Makoto Tokumaru; Toshishige Nagao; Masayuki Ariki; Hideki Nakano, all of Amagasaki, Japan

[73] Assignee: Mitsubishi Denki Kabushiki Kaisha, Japan

[21] Appl. No.: 342,852

[22] Filed: Apr. 25, 1989

[30] Foreign Application Priority Data

Apr. 26, 1988 [JP] Japan .................................. 63-104719
Jan. 7, 1989 [JP] Japan ...................................... 1-1631

[51] Int. Cl.⁵ ........................................... G01B 11/06
[52] U.S. Cl. ..................................... 356/381; 250/560
[58] Field of Search ......................... 356/381; 250/560

[56] References Cited

U.S. PATENT DOCUMENTS 4,311,392 1/1982 Yazaki et al. ........................ 356/375

FOREIGN PATENT DOCUMENTS 0075159  3/1983  European Pat. Off. .
 250764  1/1989  European Pat. Off. ............ 356/381
2287677  5/1976  France .
62-176706 11/1987 Japan .
62-255807 11/1987 Japan .
1528132 11/1978 United Kingdom .
2167279  5/1986  United Kingdom .

OTHER PUBLICATIONS

"Optics and Electronics", No. 99, New Technical Communications, p. 125.
Sensor Technique, vol. 6, No. 2, Feb. 1966.

Primary Examiner—F. L. Evans
Attorney, Agent, or Firm—Leydig, Voit & Mayer

[57] ABSTRACT

A method for measuring a film thickness of a sheet including feeding a sheet over a rotary shaft, providing a light shield parallel to the center of rotation of the rotary shaft at a predetermined distance from the rotary shaft surface to define a gap therebetween, scanning the gap with a laser beam, and measuring the time during which the laser beam passes through the gap to determine the film thickness of the sheet to be measured. A different-diameter portion is provided at the end portion of the rotary shaft for calculating a difference between the time during which the laser beam passes through the gap on the different-diameter portion and the time during which the laser beam passes through the gap on the portion of the rotary shaft adjacent to the different-diameter portion and on which no sheet is placed, and correcting the time during which the laser beam passes between the surface of the sheet and the light shield by utilizing the calculated difference to obtain the thickness of the sheet.

2 Claims, 4 Drawing Sheets

4,991,969

METHOD FOR MEASURING FILM THICKNESS

BACKGROUND OF THE INVENTION

This invention relates to a method for measuring the thickness of a film for measuring the thickness of a sheet such as magnetic tape.

FIG. 1 is a schematical diagram showing a conventional film thickness measuring apparatus disclosed in published Japanese Patent Application No. 60-174609 for example. In the figure, reference numeral 1 is a rotary shaft rotated at a predetermined speed, 2 is a light shield disposed parallel to the rotary shaft 1 at a predetermined distance from the surface of the rotary shaft 1, 3 is a sheet to be measured which is in intimate contact with the rotary shaft 1 and fed at the same speed as the rotary shaft 1, 4 and 5 are laser oscillators disposed at predetermined angles for generating laser beams 4a and 5a, respectively, 6 is a reflective mirror which is controlled to scan between the surface of the rotary shaft 1 and the light shield 2 when it receives the laser beam 4a and which is controlled to scan between the sheet 3 and the light shield 2 when it receives the laser beam 5a. 7 and 8 are lenses for collecting the laser beams 4a and 5a reflected from the reflective mirror 6, 9 and 10 are lenses for collecting the laser beam 4[a and 5a, 11 and 12 are light receivers, 13 and 14 are counters, 15 is an operator and 16 is a display.

The operation will now be described. The laser beams 4a and 5a emitted from the laser oscillators 4 and 5 are reflected at the reflective mirror 6 to scan at an equal angular velocity. The reflected laser beams 4a and 5a are focused at the lenses 7 and 8 to have the smallest beam diameters at the gap positions A (between light shield 2 and shaft 1) and B (between light shield 2 and film 3) of the gap as shown in FIGS. 1 and 2 and are scanned at a constant speed in a direction perpendicular to the rotary shaft 1 or in the direction of the gap. At this time, the light receivers 11 and 12 receive laser beams only while the laser beams 4a and 5a are traversing the gaps A and B.

Therefore, the output signals from the light receivers 11 and 12 are pulses having pulse widths proportional to the widths of the gaps A and B. These pulses are counted by the counters 13 and 14 to obtain count numbers corresponding to the pulse widths. The calculator 15 calculates the thickness from the count numbers and displays it on the display 16. When the count number of the counter 13 is a and the count number of the counter 14 is b, the thickness $t_x$ of the sheet 3 to be measured can be obtained by the following equation (1):

$$t_x = t_0(1 - b/a) \quad (1)$$

where, $t_0$ is the width (dimension) of the gap A.

Since the conventional method for measuring the film thickness is constructed as above described, the film thickness distribution in the width direction of the sheet cannot be measured.

SUMMARY OF THE INVENTION

Accordingly, the primary object of the present invention is to provide a method for measuring a film thickness free from the above discussed problems.

Another object of the present invention is to provide a method for measuring a film thickness in which the distribution of the film thickness in the longitudinal and width directions of a sheet can be accurately measured.

Another object of the present invention is to provide a method for measuring a film thickness in which the distribution of the film thickness in the longitudinal and width directions of a sheet caused by the bending and eccentricity of the rotary shaft can be accurately measured.

With the above objects in view, the method for measuring film thickness according to the present invention comprises the steps of providing a different-diameter portion at the end portion of the rotary shaft, calculating a difference between the time during which the laser beam passes through a gap on the different-diameter portion and the time during which the laser beam passes through a gap on the portion of the rotary shaft adjacent to the different-diameter portion and on which no sheet to be measured is placed, and correcting the time during which the laser beam passes between the surface of the sheet to be measured and the light shield by utilizing the calculated difference while shifting the film thickness measuring point in the axial direction of the rotary shaft to obtain the thickness of the sheet.

The method for measuring film thickness according to another embodiment of the present invention comprises the steps of moving the film thickness measuring point along the axis of the rotary shaft in synchronism with the rotation of the rotary shaft and carrying out the film thickness measurement by correcting, during operation, the distribution in the direction of the axis of the rotary shaft of the gap between the rotary shaft and the light shield caused by bending and eccentricity of the rotary shaft.

According to the method for measuring film thickness of the present invention, a thickness distribution or profile in the width and feed directions of a sheet can be obtained. Also, a film thickness distribution in the longitudinal and width directions of the sheet can be accurately measured.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
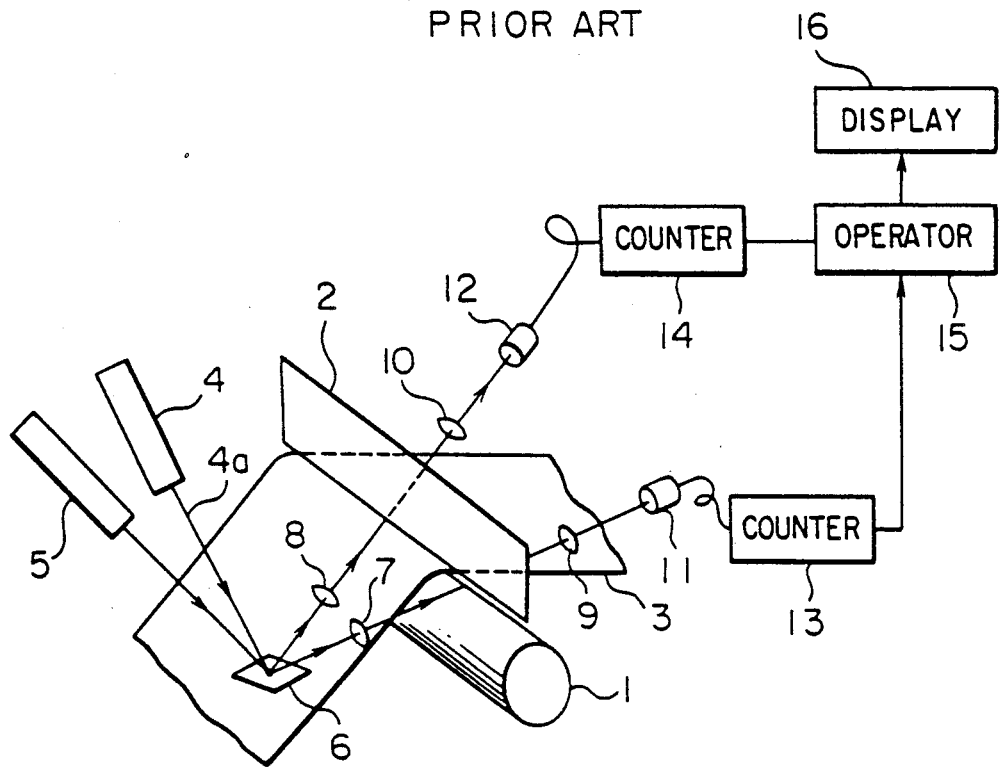
FIG. 1 is a schematic diagram of the conventional film thickness measuring apparatus.
Figure 2:
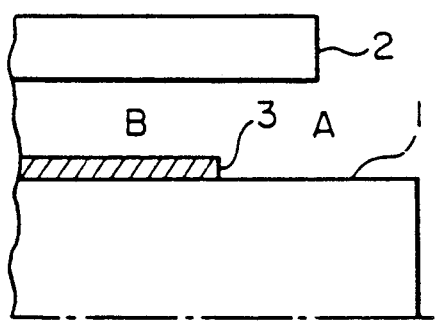
FIG. 2 is an explanatory view showing the main portion of FIG. 1.
Figure 3:
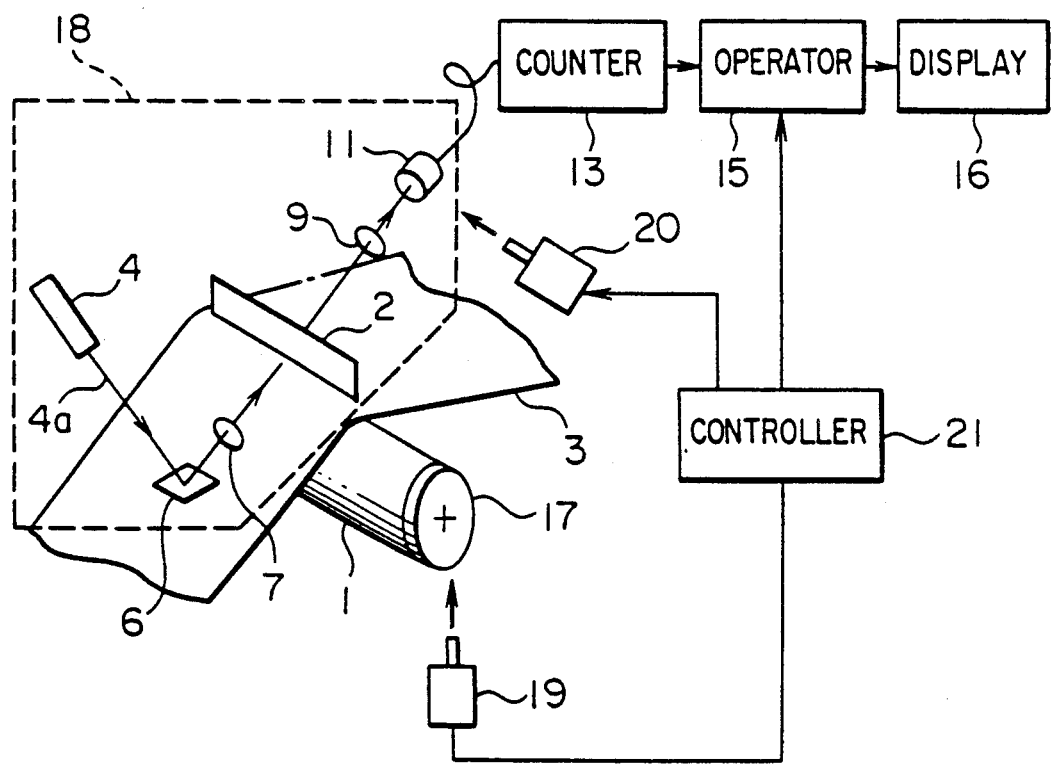
FIG. 3 is a schematic diagram illustrating an apparatus to which one embodiment of the present invention is applied.

One embodiment of the present invention will now be described in conjunction with the drawings. In FIG. 3, the components designated by reference numerals 1–4, 4a, 6–16 are similar to those of the conventional design. 17 is a reference ring for detecting a deviation of the scanning width of the laser beam, 18 is a head unit reciprocatingly movable in the direction of axis of the rotary shaft, 19 is a first servo motor for driving the rotary shaft 1 at a speed determined by a control signal from a controller 21, 20 is a second servo motor for driving the head unit 18 at a speed determined by the control signal from the controller 21, 21 is a controller for providing information on the position of head unit 18 with respect to the axial position of the rotary shaft to the operator 15 and the control signal for synchronously moving the servo motors 19 and 20.

The operation will now be described. The laser beam 4a emitted from the laser beam source 4 is reflected at the reflective mirror 6 of the scanning mechanism and moved in a scanning manner over the gap between the light shield 2 and the sheet 3, the thickness of which is to be measured, so that the laser beam 4a is received by the light received 11 only when the laser beam 4a passes through the the gap. Therefore, the output signal from the light receiver 11 is a pulse waveform having a width proportional to the dimension of the gap. These pulses are counted by the counter 13 to obtain a count number corresponding to the pulse width. The operator 15 calculates the thickness from this count number and displays it on the display 16.

Figure 4:
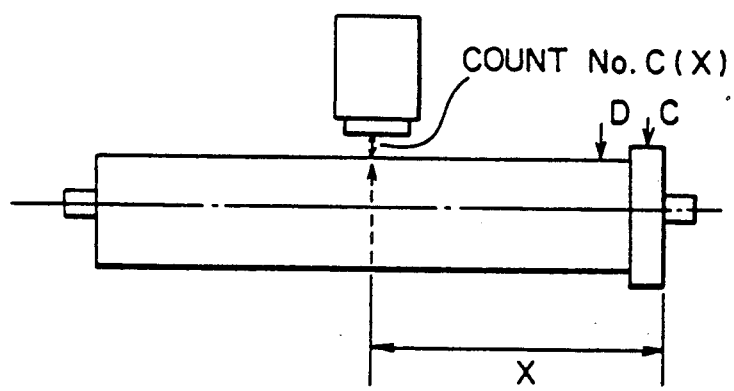
FIG. 4 is an explanatory view showing the main portion of FIG. 3.

Before beginning the film thickness measurement of sheet 3, the rotary shaft 1, without the presence of the sheet 3 is rotated synchronously with the feed speed of the sheet 3 to cause the head unit 18 to traverse one forward and backward movement between the opposite ends of the rotary shaft 1. During this movement, as shown in FIG. 4, a count number $a_0$ representing the width of the gap between the surface of reference ring 17 and the light shield 2 at the position of the reference ring (Position C), a count number $b_0$ representing the width of the gap between the rotary shaft surface at (Position D) and the light shield 2, and a count number C(X) representing the width of the gap between the light shield 2 and the rotary shaft 1 at the position X in he axial direction of the rotary shaft 1 are measured and stored in the operator 15. The first servo motor 19 drives the rotary shaft 1 at a speed in accordance with a control signal generated from the controller 21, and the second servo motor 20 receives a control signal from the controller 21 to drive the head unit 18 at the speed in synchronism with the rotary shaft 1. The position X of the head unit 18 at this time with respect to the axial direction of the rotary shaft 1 is transmitted from the controller 20 to the operator 15, where the position X and the count number representative of the distance between the light shield 2 and the rotary shaft 1 at the position X is correlated and stored as C(X).

Then the sheet is trained over and fed by the rotary shaft 1. The head unit 18 is reciprocatingly moved in the direction of the axis of the rotary shaft 1 to measure the film thickness. A count number $a_n$ representing the width of the gap between the ring surface and the light shield 2 at the position C, a count number $b_n$ representing the width of the gap between the rotary shaft surface and the light shield 2 at the position D, and a count number $C_n(X)$ representing the width of the gap between the light shield 2 and the sheet 3 at the position X of the head unit 18 are supplied to the operator 15. At this time, the ratio of the difference $b_0 - a_0$ of the pulse count numbers at the positions C and D and the above value $b_n - a_n$, which is expressed by equation (2)+, $$k_n = (b_n - a_n)/(b_0 - a_0) \qquad (2)$$

is a correction factor for correcting the variation of the laser beam scanning speed. Further, by operation-processing the stored count numbers Co(X) representing the distance between the light shield and the rotary shaft at the position X, and Cn(X) and $K_n$, the film thickness value Fn at this point at nth scan can be calculated. The film thickness is calculated the following equation (3):

$$F_n = Lk_n (Co(X) - Cn(X)) \qquad (3)$$

where, L is a proportional coefficient showing the relationship between the count number and the film thickness.

In this manner, without being affected by the variation in the laser beam scanning speed, the film thickness distribution of the sheet in the width and the length direction of the sheet can be accurately measured.

Figure 5:
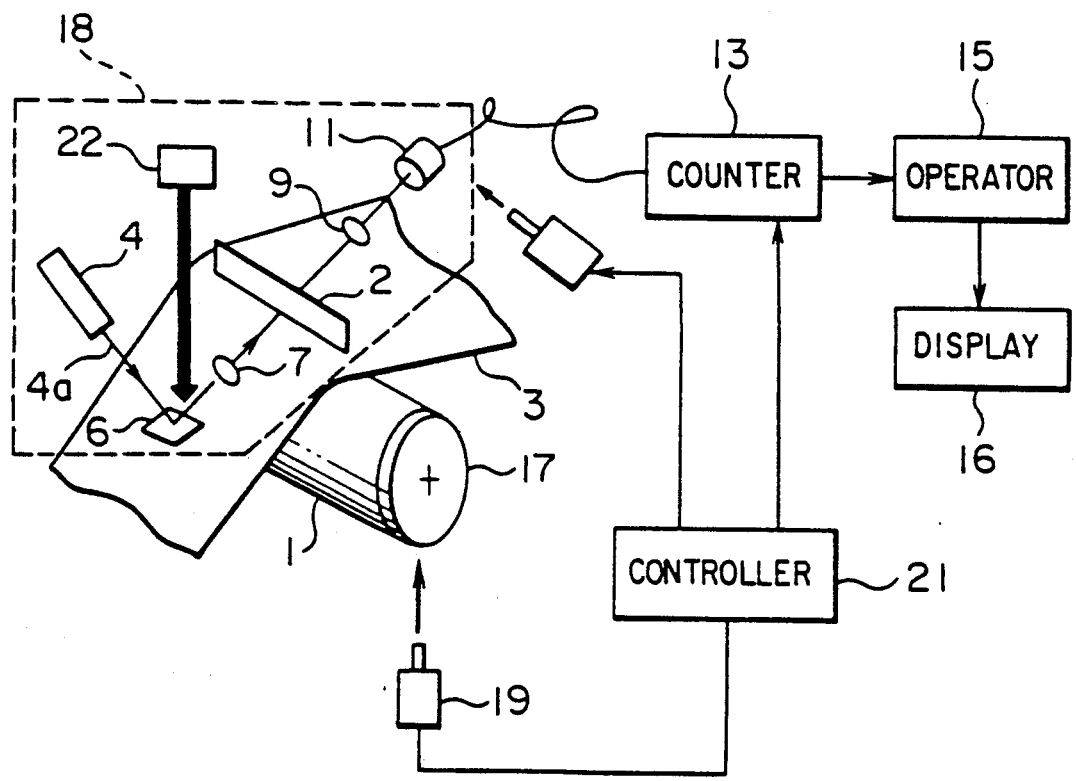
FIG. 5 is a schematic diagram illustrating an apparatus to which another embodiment of the present invention is applied.

Then, another embodiment of the present invention will now be described in conjunction with the drawings. In FIG. 5, reference numeral 22 is a reflective mirror driving current control. The reflective mirror driving current is controlled so that the ratio $k_n$ of the pulse count numbers $b_0 a_0$ and $b_n = a_n$ at the positions A and B before initiating the thickness measurement is 1. In this manner, without being affected by the variation in the laser beam scanning speed, the film thickness distribution of the sheet in the width and the length direction of the sheet can be accurately measured.

As has been described, according to the above embodiment of the present invention, a different-diameter shaft portion is provided at the end portion of the rotary shaft, and the difference between a count number when the ordinary shaft diameter portion is canned and a count number when the different-diameter shaft portion is scanned is monitored so that the variation in the laser scanning speed is corrected, whereby the film thickness distribution of the sheet in the width and the length direction of the sheet can be accurately measured.

Another embodiment of the present invention will now be described in conjunction with FIGS. 6 and 7 in which reference numerals 1–4, 4a, 6–16 are similar to those of the conventional design. 18 is a head unit reciprocatingly movable in the direction of axis of the rotary shaft, 19 is a first servo motor for driving the rotary shaft 1 at a speed determined by a control signal from a controller 21, 20 is a second servo motor for driving the head unit 18 at a speed determined by the control signal from the controller 21, which is a controller for providing information of the position of head unit 18 with respect to the axial position of the rotary shaft to the operator 15 and the control signal for moving the servo motors 19 and 20.

The operation will now be described. The laser beam 4a emitted from the laser beam source 4 is reflected at the reflective mirror 6 of the scanning mechanism and moved in a scanning manner over the gap between the light shield 2 and the sheet 3 to be measured, so that the laser beam 4a is received by the light receiver 11 only when the laser beam 4a passes through the the gap. Therefore, the output signal from the light receiver 11 is pulsed having a width proportional to the dimension of the gap. These pulses are counted by the counter 13 to obtain a count number corresponding to the pulse width. The operator 15 calculates the thickness from this count number and displays it on the display 16.

Before beginning the film thickness measurement of the sheet 3 the rotary shaft 1 without sheet 3 on it, a count number $a_0$ (X) representing the width of the gap between the light shield 2 and the rotary shaft 1 at the position X in the axial direction of the rotary shaft 1 is measured and stored into the operator 15. The first servo motor 19 drives the rotary shaft 1 at a speed in accordance with a control signal generated from the controller 21, and the second servo motor 20 receives a control signal from the controller 21 to drive the head unit 18. The position X of the head unit 18 at this time with respect to the axial direction of the rotary shaft 1 is transmitted from the controller 21 to the operator 15, where the position X and the count number representative of the distance between the light shield 2 and the rotary shaft 1 at the position X is correlated and stored as $a_0$ (X). In the operation unit 15, the value of $a_0$ (X) is stored while the head unit 18 makes one reciprocal motion in the direction of the axis of the rotary shaft 1 between the opposite ends of the rotary shaft 1.

Then the sheet 3 to be measured is trained over and fed by the rotary shaft 1 to measure the film thickness. While reciprocatingly moving the head unit 18 in the direction of axis of the rotary shaft 1, a count number $a_f$ (X) representing the gap width between the light shield 2 and the sheet 3 at the position X is supplied to the operating unit 15 as in the similar manner to the case where there is no sheet 3 on the rotary shaft 1. At this time, the film thickness value F at the position X can be determined by operation processing $a_f$ (X) with the stored count number $a_0$ (X) representing the distance between the rotary shaft and the light shield at the position X. The operating equation (4) is:

$$F = K (a_0(X) - a_f(X))  \quad (4)$$

where, K is a proportionality coefficient showing the relationship between the count number and the film thickness.

In this manner, without being affected by bending and eccentricity of the rotary shaft, the film thickness distribution of the sheet in the width and the length directions of the sheet can be accurately measured.

Figure 6:
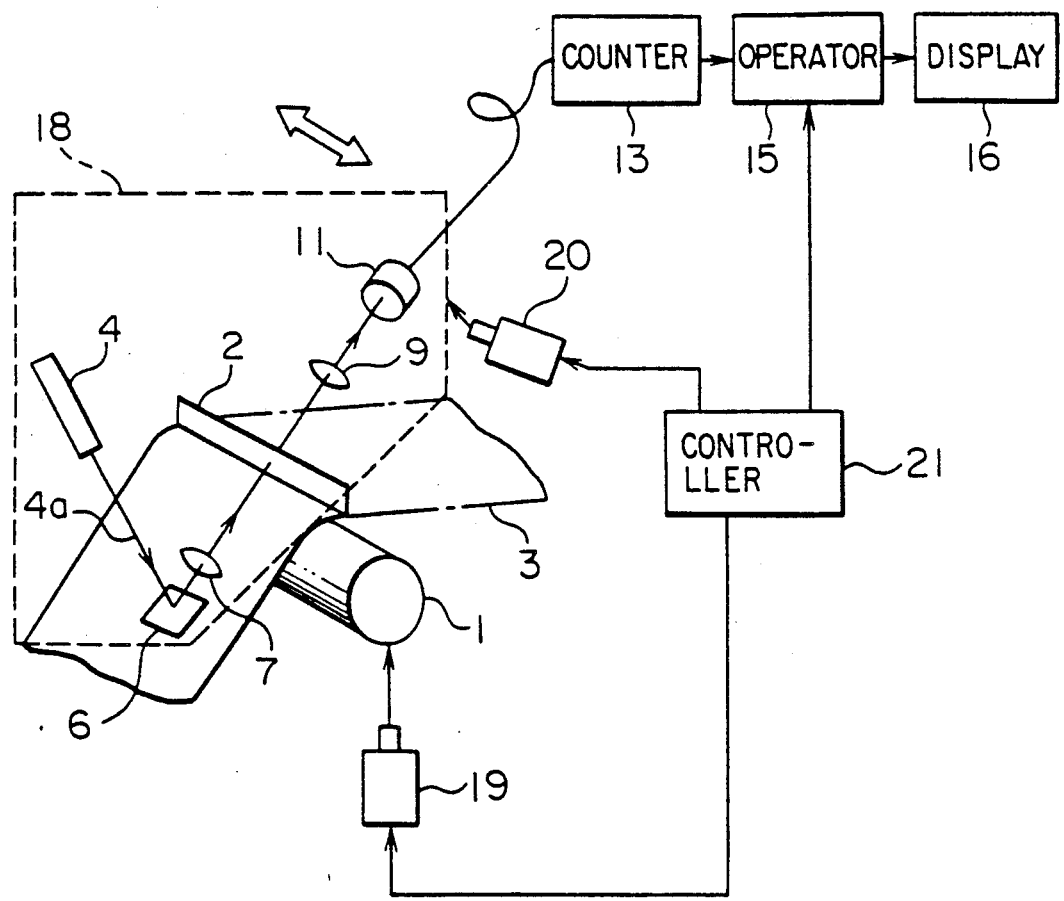
FIG. 6 is a schematic diagram illustrating an apparatus to which one embodiment of the present invention is applied.
Figure 7:
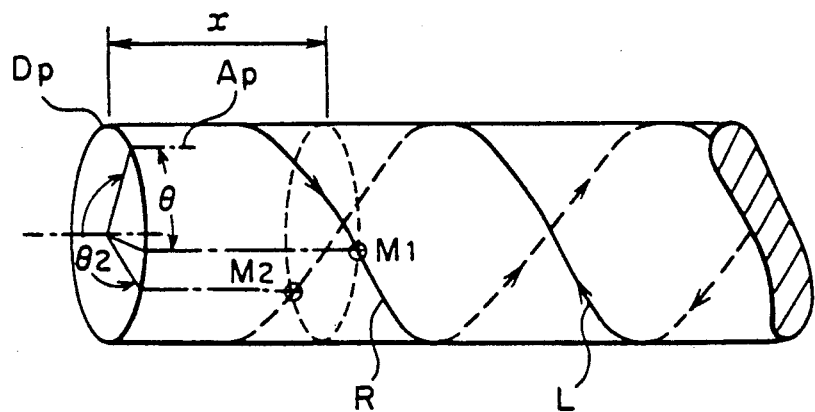
FIG. 7 is an explanatory view showing the main portion of FIG. 6.

Another embodiment of the present invention is illustrated in FIG. 6. There the first servo motor 19 drives the rotary shaft 1 in response to a control signal from the controller 21. Also, the second servo motor 20 drives the head unit 18 in response to a control signal generated from the controller 21. For example, as shown in FIG. 7, the track of the point on the rotary shaft 1 scanned by the laser beam is the same no matter how many times the head unit 18 scans the rotary shaft 1 in the axial direction. That is, as shown in FIG. 7, at the predetermined position X axially spaced from the axial reference point Dp, the measurement point $M_1$ on the track R is measured when the scanning is carried out in the rightward direction, and the measurement point $M_2$ on the track L is measured when the scanning is carried out in the leftward direction. In this case, the rotary shaft 1 and the head unit 18 are driven by the controller 21 so that the measurement points $M_1$ and $M_2$ are positioned at predetermined angles $\theta_1$ and $\theta_2$ in the direction of rotation from the rotation angle reference point Ap on the rotary shaft 1 in the axial position X.

When it is desired to measure a film thickness of the sheet 3, scanning rightwardly with no sheet 3 on the rotary shaft 1 produces a count number $a_0$ (X) representing the gap dimension between the surface of the rotary shaft 1 and the light shield 2 at the measurement point $M_1$ in the direction of the axis of the rotary shaft 1. The measured results are stored in the operating unit 15. At this time, even when the position X of the head unit 18 is the same, since the positional difference on the rotary shaft occurs in the position scanned by the laser beam in accordance with the direction of movement of the head unit 18, the count numbers obtained for the head unit 18 are separately stored such that the count number at the position X at the measurement point $M_1$ during the forward movement is stored as $a_0$ (X), and the count number at the position X at the measurement point $M_2$ during the backward movement is stored as $a_0$ (X'). (Of course, only $a_0$ (X) may be used.)

Then the sheet 3 is trained over and fed by the rotary shaft 1 to measure the film thickness. While reciprocatingly moving the head unit 18 in the direction of axis of the rotary shaft 1, a count number $a_f$ (X) representing the width of the gap between the light shield 2 and the sheet 3 at the position X is supplied to the operating unit 15 as when there is no sheet 3 on the rotary shaft 1. At this time, the film thickness value F at the position X can be determined by operation processing $a_f$ (X) with the stored count number $a_0$ (X) representing the distance between the rotary shaft and the light shield at the position X. The operating equation (4) is:

$$f = K (a_0(X) - a_f(X)) \quad (4)$$

where K is a proportionality coefficient showing the relationship between the count number and the film thickness.

In this manner, without being affected by any bending and eccentricity of the rotary shaft, the film thickness distribution of the sheet in the width and the length directions of the sheet can be accurately measured.

Further, in the above embodiment, the description has been made as to the head unit 18 which has integrally incorporated therein the light shield 2, the laser oscillator 4, the reflective mirror 6, the lenses 7 and 9 as well as the light receiver 11 and which moves as a unitary structure, similar advantageous results can be expected by arranging a head unit which cannot move but can scan in the direction of length of the rotary shaft 1.

Also, the laser oscillator 4 can be made immovable by utilizing optical fibers for conducting the laser beam.

As has been described, according to the abovedescribed embodiment of the present invention, the method for measuring the film thickness comprises the steps of moving the film thickness measuring point along the axis of the rotary shaft in synchronism with the rotation of the rotary shaft, and the film thickness measurement is carried out, by correcting for the distribution of the gap in the direction of the axis of the rotary shaft between the rotary shaft and the light shield caused by bending and eccentricity of the rotary shaft.

What is claimed is:

1. A method for measuring the thickness of a sheet comprising:
    feeding a sheet having a thickness to be measured over the surface of a rotatable shaft having a first diameter and, on one end, a different, second diameter portion the rotary shaft, over which the sheet is not fed;

disposing a light shield substantially parallel to the axis of rotation of the shaft at a predetermined distance from the surface of the shaft to define a first gap between the first diameter and the light shield and a second gap between the second diameter and the light shield;

scanning a laser beam along and transverse to the first and second gaps with no sheet present and along and transverse to the first and second gaps with the sheet present on at least part of the first diameter portion of the shaft;

measuring the time during which the laser beam passes through the first and second gaps without and with the sheet present on at least part of the first diameter portion of the shaft, respectively;

calculating the difference between (i) the time during which the laser beam passes through the second gap and (ii) the time during which the laser beam passes through the first gap without and with the sheet present; and correcting the time that the laser beam passes through the first gap between the surface of the sheet and the light shield from the calculated difference to determine the thickness of the sheet.

2. A method for measuring the thickness of a sheet comprising:

feeding a sheet having a thickness to be measured over a rotatable shaft;

disposing a light shield substantially parallel to the axis of rotation of the shaft at a predetermined distance from the surface of the shaft to define a gap therebetween;

synchronously rotating the shaft and scanning a laser beam along and transverse to the gap with the sheet present and absent so that the laser beam scans the same path relative to the shaft each time the laser beam longitudinally scans the shaft in a particular direction;

obtaining and storing first data from scanning the gap in the absence of the sheet at a measurement point on the path corresponding to a predetermined angle of rotation of the shaft relative to a rotation reference angle on the shaft and at a predetermined longitudinal position on the shaft relative to a longitudinal reference point on the shaft;

obtaining and storing second data from scanning the gap between the sheet on the shaft at the measurement point; and calculating from the first and second data the film thickness of the sheet.

* * * * *